United States Patent
Suzuki et al.

(10) Patent No.: US 6,555,272 B2
(45) Date of Patent: *Apr. 29, 2003

(54) LITHIUM SECONDARY BATTERY AND ACTIVE MATERIAL FOR NEGATIVE ELECTRODE IN LITHIUM SECONDARY BATTERY

(75) Inventors: Kimihito Suzuki, Tokyo (JP); Takeshi Hamada, Chiba (JP); Taro Kono, Tokyo (JP); Tsutomu Sugiura, Chiba (JP); Hiromasa Shoji, Chiba (JP)

(73) Assignee: Nippon Steel Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/393,885

(22) Filed: Sep. 10, 1999

(65) Prior Publication Data

US 2002/0146623 A1 Oct. 10, 2002

(30) Foreign Application Priority Data

| Sep. 11, 1998 | (JP) | 10-258673 |
| Sep. 8, 1999 | (JP) | 11-254358 |
| Sep. 8, 1999 | (JP) | 11-254359 |

(51) Int. Cl.[7] ............................................. H01M 4/58
(52) U.S. Cl. ................ 429/231.8; 429/217; 429/231.95
(58) Field of Search ............................. 429/217, 231.8, 429/231.95

(56) References Cited

U.S. PATENT DOCUMENTS 5,571,637 A * 11/1996 Idota ........................ 429/218
6,063,522 A * 5/2000 Hamrock et al. ........... 429/200
6,156,457 A * 12/2000 Takami et al. .............. 423/439

FOREIGN PATENT DOCUMENTS

| JP | 6-60867 | 3/1994 |
| JP | 6-325764 | 11/1994 |
| JP | 7-29602 | 1/1995 |
| JP | 7-57780 | 3/1995 |
| JP | 7-122274 | 5/1995 |
| JP | 7-220721 | 8/1995 |
| JP | 7-240201 | 9/1995 |
| JP | 7-249409 | 9/1995 |
| JP | 8-138744 | 5/1996 |
| JP | 8-203524 | 8/1996 |
| JP | 9-63651 | 3/1997 |
| JP | 9-147856 | 6/1997 |
| JP | 10-64541 | 3/1998 |
| JP | 10-83817 | 3/1998 |
| JP | 10-125309 | 5/1998 |
| JP | 10-134800 | 5/1998 |
| JP | 10-162823 | 6/1998 |
| JP | 11040158 A * | 2/1999 | ............. H01M/4/58 |
| WO | 98/24135 | 6/1998 |

* cited by examiner

*Primary Examiner*—Carol Chaney
*Assistant Examiner*—Dah-Wei D. Yuan
(74) *Attorney, Agent, or Firm*—Wenderoth, Lind & Ponack, L.L.P.

(57) ABSTRACT

A lithium secondary battery comprising a positive electrode active material, a negative electrode active material, and a non-aqueous electrolyte is disclosed. The negative electrode active material is a powder of a silicon material containing boron and has a boron content in the range of 0.1–50 wt. %.

20 Claims, No Drawings

LITHIUM SECONDARY BATTERY AND ACTIVE MATERIAL FOR NEGATIVE ELECTRODE IN LITHIUM SECONDARY BATTERY

BACKGROUND OF THE INVENTION

1. Field of the Invention

This invention relates to a lithium secondary battery and an active material for negative electrode to be used therein. More particularly, this invention relates to a high performance lithium secondary battery having a high voltage and a large discharge capacity and showing only a small capacity loss during charging and discharging and a negative electrode-active material to be used in the lithium secondary battery.

This invention further relates to a negative electrode-active material which has a capacity exceeding the theoretical one of graphite, a high initial efficiency and an outstanding cycle property, and the secondary battery used thereof.

2. Description of the Related Art

The lithium secondary battery has a high energy density and, therefore, has been finding utility as power sources for mobile telecommunication terminals and portable information terminals. The market for the lithium secondary battery has been rapidly expanding in concert with the dissemination of such terminals. Concurrently, the graphite type carbonaceous material as the active material for terminal devices has a high discharge capacity exceeding 300 mAh/g and a high initial efficiency of not less than 90%. Further, it can retain a discharge capacity of not less than 50% even after 500 charge-discharge cycles because the expansion and contraction thereof in consequence of the insertion and withdrawal of lithium ions into and from the interlayer space of graphite during a cycle of charging and discharging is as low as about 10% and the deterioration of the amount of discharge thereof in consequence of the growth of the total of charge-discharge cycles is extremely small. The graphite type carbonaceous material, thus, is endowed with quality which is craved for by the negative electrode-active material in a lithium ion secondary battery.

The amount of lithium that can be reversibly inserted into and withdrawn from the material is one lithium atom at most per six carbon atoms. The theoretical limit of capacity of a carbonaceous material for charging and discharging is 372 mAh/g in terms of electric capacity. The existing secondary battery is used at a level approximating this threshold capacity, it cannot be expected to achieve a drastic improvement in performance. The existing secondary battery is nevertheless expected to achieve a further expansion of capacity. In the circumstance, the desirability of developing a negative electrode-active material having a high discharge capacity surpassing the theoretical capacity of graphite meanwhile retaining the high initial efficiency, the low expansion and contraction ratio during each charge-discharge cycle, and the high cycle property which are had by the graphite type carbonaceous material currently finding extensive utility in the practical cells has been finding enthusiastic recognition.

Under this circumstance, a search for a material other than carbon, i.e. an inorganic compound such as, for example, an alloy or an oxide having a capacity far surpassing 372 mAh/g has been gradually taking shape. It has been found that among other such inorganic compounds, crystalline and amorphous oxide materials containing tin and silicon manifest a discharge capacity approximating closely to 1000 mAh/g (as disclosed in JP-A-07-220,721 and JP-A-07-249,409, for example). It has been recently reported that a negative electrode-active material using elementary silicon exhibits an initial discharge capacity in the neighborhood of 3000 mAh/g;(Battery Symposium in Japan, 3A16 (1997)) and that a negative electrode-active material using silicon oxide exhibits an initial discharge capacity in the neighborhood of 1500 mAh/g (The 38th Panel Discussion on Cells, 3A17 (1997)), meaning a discharge capacity far surpassing the threshold capacity of the graphite type carbonaceous material. The fact that these materials invariably have a large initial charge capacity relative to their initial discharge capacity, namely the fact that the capacity loss during each charge—discharge cycle is very large (about 1000 mAh/g in both materials) and the cycle property is inferior (the capacity halved within first several charge—discharge cycles), has posed a serious problem.

Meanwhile, as materials of silicon containing boron, a silicon boride alloy structure of the general formula, $SiB_n$, having n in the range of 0.1 to 3 (JP-A-53-136,630) and a and the powder of a silicon boride compound of the same general formula having n in the range of 3.2 to 6.6 and formed mainly of $SiB_4$ (JP-A-08-138,744 and U.S. Pat. No. 5,571,637) have been respectively disclosed.

The alloy structure mentioned above indeed exhibits a large discharge capacity proper for silicon which far surpasses that of the graphite type carbonaceous material but permits no easy quantity production as compared with an electrode which, as found in the recently feasibilized lithium ion cell, is fabricated by applying on a collector foil a slurry obtained by blending an active material with a binder because this structure is an electrode produced by immersing a collector matrix in an alloy bath. Further, since this alloy structure permits no easy decrease in the film thickness thereof, it encounters a big problem in reversibility as evinced by the fact that the electrode permits no thorough diffusion of lithium therein under a large current density and consequently induces a large polarization resistance and the fact that the capacity loss during each charge-discharge cycle is inevitably enlarged because the occluded lithium cannot be thoroughly extracted. In contrast, the powder of silicon boride compound having $SiB_4$ as a main component was not able to give a higher discharge capacity than the graphite type carbonaceous material.

WO98/24,135 discloses a material for a negative electrode which is obtained by subjecting silicon or a compound thereof to a heat treatment in the presence of an organic material or a carbonaceous material. Since this is a material formed of silicon and carbon substantially exclusively, the problem of a very large expansion-contraction which is attendant on the charging-discharging of silicon inducing an alloying reaction with lithium and the problem of an inferior cycle property remain yet to be solved.

SUMMARY OF THE INVENTION

An object of this invention is to provide a novel negative electrode-active material for use in a lithium secondary battery and a lithium secondary battery produced by using the material.

More specifically, an object of this invention is to provide a lithium secondary battery having a high initial efficiency and a high cycle property meanwhile realizing a high discharge capacity and a negative electrode-active material to be used in the secondary battery.

Still more specifically, an object of this invention is to provide a negative electrode-active material for use in a lithium secondary battery which is liberated from the aforementioned problems arising in the use of a boron-containing silicon material as a negative electrode-active material for a lithium secondary battery, namely the problem of unsuitability for quantity production, the problem of causing a serious capacity loss during each charge-discharge cycle and exhibiting only inferior reversibility, and the problem of obtaining only a lower discharge capacity than the graphite type carbonaceous material, and to provide a lithium secondary battery obtained by using the active material.

Yet another object of this invention is to provide a negative electrode-active material for a lithium secondary battery having a high initial efficiency and a high cycle property and offering a solution to the problem of expansion and contraction attendant on charging-discharging meanwhile realizing a discharge capacity exceeding 372 mAh/g which is the theoretical capacity of graphite, and to provide a lithium secondary battery obtained by using the active material.

The present inventors have pursued a diligent study on the powder of a boron-containing silicon material based on the electrochemical property of the powder of silicon material itself with a view to attaining the objects mentioned above, and have consequently discovered that by mixing the powder of a silicon material having a suitable particle size with a boron at a low concentration and heat-treating the resultant mixture under a certain condition, the powder of a boron-containing silicon material allowing only exclusive existence of silicon boride($SiB_4$) in a considerably smaller amount than the amount of silicon boride thermodynamically estimated from the boron content and assuming a substantially supercooled state and that the active material is enabled by using this powder to manifest outstanding electrode properties such as markedly improved capacity loss and a fine cycle property meanwhile retaining a large discharge capacity far surpassing that of the graphite type carbonaceous material proper for silicon. This invention has been completed based on this knowledge.

Namely, the negative electrode-active material of this invention for use in a lithium secondary battery comprises a powder of boron containing silicon material and characterized by the boron content in the silicon material being in the range of 0.1–50 wt. %.

Further, in a preferred embodiment of this invention, a negative electrode-active material is provided, wherein the powder of the negative electrode-active material has a 50% cumulative diameter ($d_{50}$) is in the range of 1–100 μm. In another preferred embodiment of this invention, a negative electrode-active material is provided, wherein the powder of negative electrode-active material is found by the X-ray wide angle diffraction method to have a ratio $I(SiB_4:021)/I(Si:111)$ of the peak intensity $I(SiB_4:021)$ of the diffraction line from the (021) plane of $SiB_4$ to the peak intensity $I(Si:111)$ of the diffraction line from the (111) plane of Si is not more than 1.

In still another embodiment of this invention, a negative electrode-active material for a lithium secondary battery is provided, wherein the active material is formed of a mixed powder comprising the powder of a carbon material containing or not containing boron and the powder of a silicon material containing boron in a specified amount mentioned above, namely, being in the range of 0.1–50 wt. % of the silicon material.

In the negative electrode-active material formed of the mixed powder mentioned above and used in the lithium secondary battery according to this invention, the 50% cumulative diameter ($d_{50}$) of the mixed powder is preferred to be in the range of 1–100 μm, the ratio $I(SiB_4:021)/I(Si:111)$ of the peak intensity $I(SiB_4: 021)$ of the diffraction line from the (021) plane of $SiB_4$ to the peak intensity $I(Si:111)$ of the diffraction line from the (111) plane of Si, which are found in an analysis of the mixed powder by the X-ray wide angle diffraction method, is preferred to be not more than 1.

Further, the powder of a carbon material containing or not containing boron which is used in the negative electrode-active material formed of the mixed powder mentioned above and used in the lithium secondary battery according to this invention is preferred to be a carbon material of high crystallinity. When the powder of a carbon material contains substantially no boron, the ratio $I(C:101)/I(C:100)$ of the peak intensity $I(C:101)$ of the diffraction line from the (101) plane of carbon to the peak intensity $I(C:100)$ of the diffraction line from the (100) plane of carbon appearing in the diffraction peaks of the mixed powder measured by the wide angle X-ray diffraction pattern is preferred to be not less than 1 and when the powder of the carbon material contains boron, the ratio $I(C:101)/I(C:100)$ is preferred to be not less than 2.

The present invention which accomplishes the objects mentioned above also provides a lithium secondary battery comprising a positive electrode-active material, a negative electrode-active material, and a non-aqueous electrolyte and characterized by using the powder of a silicon material containing boron in an amount in the range of 0.1–50 wt. % as the negative electrode-active material.

The present invention which accomplishes the objects mentioned above further provides a lithium secondary battery containing a positive electrode-active material, a negative electrode-active substance, and a non-aqueous electrolyte, and characterized by using a mixed powder formed of the powder of a carbon material containing or not containing boron and the powder of a siliceous material containing boron in an amount in the range of 0.1–50 wt. % as the negative electrode-active material.

The negative electrode-active material of this invention for use in the lithium secondary battery can provide a lithium secondary battery of excellent reversibility and high energy density which is capable of drastically decreasing the capacity loss meanwhile retaining the high discharge capacity proper for silicon metal and oxide.

The above and other objects, features, and advantages of the present invention will become clear from the following description of the preferred embodiments.

DESCRIPTION OF THE PREFFERED EMBODIMENTS

Now, the concrete contents of this invention will be described in detail below based on preferred embodiments.

The negative electrode-active material for use in the lithium secondary battery according to this invention is formed of powder of a silicon material containing boron at a low concentration.

The powder of such a boron-containing silicon material is a powder of a boron-containing silicon material having only a small silicon boride ($SiB_4$) content and assuming a substantially supercooled state which is obtained, for example, by mixing a silicon material with boron at a low concentration, heat-treating the resultant mixture, and optionally pulverizing and classifying the heat-treated mixture. The use of the material having the particle size, the specific surface area, and the amount of silicon boride formed as a coexisting phase controlled as described above has resulted in successful development of an electrode which permits quantity production, has a far larger discharge capacity than the graphite type carbonaceous material, and exhibits a dramatically lowered capacity loss during each charge-discharge cycle and a drastically improved cycle property.

The following discussion is offered concerning the effect of boron which has played an important role in improving the properties of an electrode formed solely of silicon.

The reaction of elementary silicon or silicon oxide with lithium is inferred to proceed as follows in accordance with the report (J. Electrochem. Soc., 144, 6, 2045 (1997)) concerning tin metal and oxide which are expected to produce a reaction similar to the present system. It is suspected that this reaction is basically alloying and dealloying reactions of silicon as a host with lithium. When silicon undergoes an alloying reaction with a large amount of lithium during charging, it induces various phase changes and produces a large voluminal expansion in consequence of the change of concentration of lithium. Conversely, during discharging, the reaction induces a large voluminal contraction in conjunction with a phase change in consequence of the withdrawal of lithium from the alloy phase with lithium. Though the cause for the irreversible capacity which occurs in elemental silicon and silicon oxide is not clear, the decay of the shape of the electrode and the decline of the collection efficiency resulting from the large phase change and voluminal change arising during each charge-discharge cycle may be a cause for the large capacity loss and the decline of the reversibility which occur during the charge-discharge cycle.

The reason for the decrease of the irreversible capacity mentioned above which is ascribable to the use of the powder of a boron-containing silicon material of this invention having a small boron compound content and assuming a substantially supercooled state has not yet been elucidated. The decrease of the irreversible capacity may be logically explained, for example, by the fact that the decline of collection efficiency is repressed and the irreversible capacity is decreased because the depth of charging is decreased and the expansion of crystalline structure is repressed when the powder of a boron-containing silicon material of this invention has a smaller degree for the maximum alloying composition with lithium than elementary silicon, the fact that in the crystalline structure which is rendered fit for diffusion of lithium by containing boron, the diffusion of lithium is faster and the irreversible capacity is smaller than in pure silicon, and the fact that the irreversible capacity is decreased because the electric conductivity of the material itself is improved by the formation of an acceptor level due to the doping of boron.

By forming the material of silicon containing boron in the shape of a powder having a proper particle size and using the powder for the negative electrode-active material of a lithium secondary battery, the line for manufacture of the electrodes for lithium ion batteries mounting the recently feasibilized graphite type carbonaceous powder can be used without alteration and, as a result, the quantity production of batteries with the existing equipment is realized. Further, the electrode formed as coated with a powder is capable of improving the efficiency of the quantity of electricity and decreasing the capacity loss during each charge-discharge cycle because it permits transformation of itself into a thin film which is advantageous for diffusion of lithium in the electrode as compared with the conventional alloy structure and allows generous repression of polarization resistance under a large current density.

As respects the powder of a boron-containing silicon material according to this invention, the powder of silicon material requires to have a boron concentration satisfying the range of 0.1–50% by weight of the silicon material. If the boron concentration is less then 0.1 wt. %, the shortage brings the disadvantage that the effect of the inclusion of boron cannot be sufficiently manifested and the large capacity loss manifests itself during each charge-discharge cycle similarly to elementary silicon. Conversely, the material having a boron concentration of not less than 0.1 wt. % shows a dramatic improvement in the electrode characteristics due to the inclusion of boron. If the boron concentration exceeds 50 wt. %, the excess entails the disadvantage that the discharge capacity and the energy density per unit weight are extremely lowered because the silicon boride such as $SiB_4$ which is copiously formed makes no contribution to the reaction for occlusion (alloying) of lithium. It is more commendable that the boron concentration is in the range of 10 wt. %–50 wt. %, preferably in the range of 20 wt. %–40 wt. %. When the boron content in the powder of silicon material is not less than 10 wt. %, the powder of silicon material is enabled to manifest a still higher, cycle characteristic. This improvement may be logically explained by supposing that in the phenomenon discovered during the study for the sake of this invention, namely the fact that the expansion-contraction of the powder of silicon material due to charging-discharging is repressed by the addition of boron, the effect of this addition is particularly heightened when the boron content is not less than 10 wt. %.

As concerns the particle size of the powder of a boron-containing silicon material according to this invention, the 50% cumulative diameter ($d_{50}$) of this powder is preferred to satisfy the range of 1–100 μm, particularly the range of 5–50 μm. If this diameter, $d_{50}$, is less than 1 μm, the shortage will bring the disadvantage that the consequent increase of particles of a small particle diameter clearly degrades the handling property, requires the binder and the conducting agent to be increased, and possibly lower the energy density per unit volume. Conversely, if the diameter, $d_{50}$, exceeds 100 μm, the excess will entail the disadvantage that the diffusion of lithium to the interior of the particles of the active material possibly becomes difficult and the electrodes for use in the existing lithium ion batteries which have an approximate thickness of not more than 200 μm are manufactured with increased difficulty.

The specific surface area of particles of the boron-containing silicon material powder is preferred to be not more than 100 m$^2$/g. If this specific surface area exceeds 100 m$^2$/g, the excess will bring the disadvantage that the large surface area possibly enlarges the capacity loss because the powder induces a reaction with the electrolyte during the initial charging and the reactivity of the lithium occluded in the material during each charge-discharge cycle with the solvent in the electrolyte possibly increases to the extent of lowering the safety. Though the lower limit of the specific surface area does not need to be particularly discriminated, it may be approximately 0.01 m$^2$g in consideration of the possibility that the diffusion of lithium, to the interior of the active material particles is attained with difficulty and the manufacture of thin electrodes is accomplished with difficulty.

Further, in this invention, in the diffraction peaks observed by the measurement of the wide angle X-ray diffraction pattern of the boron-containing silicon material powder, the peak intensities I(Si:111) and I($SiB_4$:021) respectively of the diffraction line from the (111) plane of Si and the diffraction line from the (021) plane of $SiB_4$ are preferred to satisfy the relation of the following formula:

$$I(SiB_4:021)/I(Si:111) \leq 1$$

When the peak intensity ratio exceeds 1, this fact implies the presence of the coexisting $SiB_4$ in a considerable amount in the material and brings the disadvantage that the discharge capacity and the energy density per unit weight are inevitably lowered excessively and the cycle characteristic is possibly degraded because $SiB_4$ itself makes no contribution to the reaction of occlusion (synthesis) of lithium.

Here, the wide angle X-ray diffraction pattern originating in the particles of a boron-containing silicon material in the active material for the lithium ion secondary battery of this invention is mainly attributed to the peaks originating in Si and $SiB_4$. The particles of a boron-containing silicon material mentioned above, however, is not a simple mixture of Si and $SiB_4$. By the observation with a transmission electron microscope, it is confirmed that numerous minute grains of silicon boride ($SiB_4$) grains are precipitated in the individual particles of the boron-containing silicon material powder or that this silicon boride is at the stage of initial precipitation and that numerous very complicated local strains are present in the individual particles of the silicon material powder. The present inventors hold a presumption that the size of the precipitated $SiB_4$ spots, the manner of precipitation thereof, the boron forming a solid solution in the particles of the silicon material, the numerous local strains etc. contribute to the manifestation of the excellent performance of the active material of this invention through the mechanism yet to be elucidated in detail.

While the proportion of the presence of $SiB_4$ implied by the ratio of peak intensities mentioned above is stoichiometrically decided by the amount of boron to be added and the reaction temperature (phase diagram of boron and silicon reported, for example, by J. Less-common Met., 71, 195 (1980)), the amount of silicon boride ($SiB_4$) coexisting in the material is influenced largely by the form of silicon in the raw material and the pattern of heat-treatment. Particularly when the silicon as the raw material is in the form of a powder and the temperature falls quickly in the step of decreasing temperature of heat treatment, a boron-containing silicon material having $SiB_4$ in a small proportion of presence therein and, therefore, containing silicon boride in a small amount and assuming a substantially supercooled state can be prepared.

Concerning the powder of a boron-containing silicon material according to this invention, although the lower limit of the ratio of peak intensities $I(SiB_4:021)/I(Si:111)$ does not need to be particularly restricted, the proportion can embrace the value of 0 for the reason adduced herein below. The powder of a boron-containing silicon material according to the present invention, even by containing boron in a minute amount of 0.1 wt. % as described above, is enabled to manifest the dramatic improvement in the electrode characteristic as compared with the material formed solely of silicon and, in the mode of addition in such a small amount, the boron forms a solid solution so thoroughly with silicon that no peak of $SiB_4$ is observed. With the accuracy of measurement of the now existing wide angle X-ray diffraction method, the detection limit of the ratio of peak intensities is approximately 0.01. At a value lower than this level, even if a diffraction peak originating in $SiB_4$ exists, the possibility that this diffraction peak will not be easily discriminated from the noise on the background is not deniable. When the ratio of peak intensities is lower than 0.01, therefore, it is difficult to discern clearly whether the diffraction peak originating in $SiB_4$ is present or not. In any event, so long as the fact that boron is contained in the particles of silicon material is clear, this fact constitutes itself a preferred embodiment of this invention, irrespectively of the question whether the boron is in the state of a perfect solid solution with silicon or part of the boron is precipitated as silicon boride. Incidentally, the ratio of peak intensities which is not less than 0.01 and not more than 1 is naturally embraced as a preferable embodiment of this invention.

The crystallinity of the powder of a boron-containing silicon material is not particularly discriminated. When the crystallinity of the powder of a boron-containing silicon material is extremely low (as when the crystallite size rated by the X-ray diffraction is not more than 10 nm, for example), the potential during a relevant charge-discharge cycle no longer shows a flat dependency to the amount of charging-discharging. This fact finds no favorable approval from the viewpoint of securing a stable voltage independently of the amount of discharge in a cell using the powder.

The powder of a boron-containing silicon material as the negative electrode-active material for used in the lithium secondary battery of this invention does not need to be particularly discriminated on account of method of manufacture. It can be prepared, for example, by the following method. The powder of a silicon having the diameter, $d_{50}$, in the range of 1–100 μm is mixed with the powder of a boron compound in an amount of 0.1–50 wt. %, as boron, of the total weight of silicon and boron used. The mixture is heated in an atmosphere of argon to a temperature in the range of 1350° C.–1400° C., then retained at this temperature for a period in the range of 1–10 hours, subsequently suddenly cooled to 600° C. at an approximate rate of 15° C./minute, and thereafter cooled to the neighborhood of room temperature at an approximate rate of 5° C./minute. The powder obtained by heat-treatment is optionally pulverized and classified for adjustment of particle size. The atmosphere for the heat-treatment has only to resist oxidation. It is permissible to use nitrogen, for example, besides argon.

The powder of a silicon which is used as a raw material herein is allowed to contain various elements other than Si. For example, at least one member selected from the group consisting of carbon, oxygen, hydrogen, nitrogen, sulfur, phosphorus, halogens, alkali metals, alkaline earth metals, transition metal elements, Al, Ga, In, Ge, Sn, Pb, Sb, and Bi may be contained. The total content of these elements is preferred to be in the range of 0–10 wt. %, preferably in the range of 0–5 wt. % of the silicon powder.

The powder of a boron compound which is the other raw material has only to be capable of finally forming a solid solution of boron in silicon at a boron concentration in the range specified by this invention. As concrete examples of the boron compound, elementary boron, boron oxide, boric acid, boron carbide, and boron nitride may be cited. These boron compounds may be suitably used either singly or in the form of a mixture of two or more members.

The method for mixing the raw materials is only required to be such that the samples are fully uniformly mixed with each other. While a V-blender, a kneader, or a ball mill can be used advantageously, they form no exclusive examples. The particle size and the specific surface area of the fired powder of a boron-containing silicon material can be adjusted by any of the various methods generally adopted in the industry. For the pulverization, a ball mill, a pin mill, a disc mill, an impeller mill, a jet mill, a roller mill, a stamp mill, and a cutting mill are advantageously used. For the classification, an air classifier and a sieve are favorably used. These are no exclusive examples.

Further, the negative electrode-active material for use in the lithium secondary battery according to this invention can be obtained in the form of a mixed powder by adding the powder of a carbon material to the powder of such a boron-containing silicon material as mentioned above.

Specifically, one preferred embodiment of the negative electrode-active material for use in the lithium secondary battery according to this invention is characterized by being a mixed powder between the powder of a carbon material and the powder of a silicon material containing boron in an amount in the range of 0.1–50 wt. %.

The negative electrode-active material according to this invention obtained in the form of such a mixed powder as mentioned above has a particularly excellent performance in terms of cycle property and ratio of expansion and contraction during each charge-discharge cycle despite having a high discharge capacity. The cause for this peculiar performance remains yet to be elucidated. The mixed powder contains the powder of a carbon material, typically the powder of a carbon material having a high degree of graphitization. Since the powder of a carbon material of this quality generally can be easily deformed, it can absorb the relatively large expansion-contraction arising in consequence of the charging and discharging of the powder of a boron-containing silicon material. It is suspected that this quality of the mixed powder constitutes itself an important cause for the peculiar performance.

The powder of a carbon material to be used in this invention may not contain boron substantially or may contain boron.

From the viewpoint of discharge capacity, the powder of the carbon material is preferred to have high crystallinity (so-called high degree of graphitization). The high crystallinity can be confirmed by X-ray diffraction, for example. In this case, the powder of the carbon material functions as an electrical conductor and, at the same time, functions as a negative electrode-active material having a discharge capacity of about 300 mAh/g.

In the embodiment in which the negative electrode-active material according to this invention is the mixed powder formed between the powder of a carbon material and the powder of a boron-containing silicon material as described above, the particle size of this active material is preferred to fulfill the conditions that the 50% cumulative diameter ($d_{50}$) is in the range of 1–100 $\mu$m as in the case of the negative electrode-active material which is formed exclusively of the powder of a boron-containing silicon material as described above. The relative surface area of the powder is preferred to be not more than 100 m$^2$/g as described above.

The behavior as powder of the carbon material powder substantially determines the behavior as powder of a negative electrode-active material for the lithium secondary battery. The powder of the carbon material mentioned above is preferred to have the behavior as powder thereof in terms of average particle diameter, particle size distribution, specific surface area, tap density, powder particles, distribution of particle shapes, and angle of repose so adjusted as to satisfy the behavior as powder required of the negative electrode-active material for the lithium secondary battery. For example, the average particle diameter of the powder of the carbon material is preferred to be not less than 10 $\mu$m and not more than 50 $\mu$m and the specific surface area thereof to be not less than 0.1 m$^2$/g and not more than 5 m$^2$m/g.

The powder of the carbon material mentioned above in the negative electrode-active material for the lithium secondary battery of this invention can be manufactured, for example, by the following method. First, in the case of the powder of a carbon material containing no boron, a coal tar type pitch coke (carbonized carbon) is pulverized and classified to prepare a powder of carbon material of 325 mesh under containing particles of not more than 10 $\mu$m in a volumetric ratio of not more than 10%. This powder of carbon material is heated to about 2900° C. under an atmosphere resisting oxidation such as the atmosphere of argon, then retained at this temperature for about one hour, and subsequently cooled to the neighborhood of room temperature. The powder obtained by this heat treatment is simply disintegrated to afford the powder of a carbon material usable for the negative electrode-active material of the lithium secondary battery according to this invention. In the case of a boron-containing carbon material, the coal tar type pitch coke (carbonized carbon) is pulverized and classified to prepare a powder of a carbon material, 325 mesh under, containing particles of not more than 10 $\mu$m in a volumetric ratio of not more than 10%. This powder of the carbon material is mixed with the powder, 325 mesh under, of one or more boron compounds selected from among elementary boron, boron oxide, boric acid, boron carbide, and boron nitride and added thereto in an amount in the approximate range of 0.5 wt. %–10 wt. %, as boron, of the total amount of carbon material and boron compounds, and the mixture is heated to about 2900° C. in an atmosphere of argon, then retained at this temperature for about one hour, and subsequently left cooling to the neighborhood of room temperature. The mixture resulting from the heat treatment is pulverized and classified as generally required. Consequently, the powder of the carbon material is obtained which can be used for the negative electrode-active material of the lithium secondary battery contemplated by this invention.

When the negative electrode-active material to be used for the lithium secondary battery of this invention is the mixture of the carbon material powder and the boron-containing silicon material powder, the carbon material powder does not need to be particularly restricted. It may be artificial graphite originating in petroleum tar, natural graphite, or kish graphite other than such artificial graphite originating in coal tar as mentioned above. Such graphite may be made to contain boron therein by such a heat treatment as mentioned above.

In the embodiment in which the negative electrode-active material according to this invention is a mixed powder of the carbon material powder and the boron-containing silicon material powder, this active material is preferred to satisfy such specific conditions as shown below.

The conditions shown below have stemmed from the present inventors' knowledge that the mixed powder obtained by mixing and combined the carbon material powder having a suitable crystallographic property with the silicon material powder having a suitable boron content and a suitable crystallographic characteristic at a suitable ratio depending on the boron content in the powder of the silicon material realizes a discharge capacity exceeding the theoretical capacity, 372 mAh/g, of graphite, has a high initial efficiency and a high cycle property, and represses to the minimum the problem of the expansion-contraction dependent on charging and discharging Firstly, when the powder of a carbon material to be used contains substantially no boron, the mixed powder mentioned above is allowed to have a high capacity, a high initial efficiency, and a high cycle property and attain successful repression of the expansion-contraction during each charge-discharge cycle by satisfying the formula:

$$0.01+0.1 \times z/(y+z) \leq (y+Z)/(x+y+z) \leq 0.15+z/(y+z) \quad (1)$$

wherein x represents the carbon content (wt. %), y the silicon content (wt. %), and z the boron content (wt. %)

respectively in the mixed powder, and $x+y+y$ is substantially 100%. More preferably, the mixed powder satisfies $0.05+0.1 \times z/(y+z) \leq (y+z)/(x+y+z) \leq 0.1+z/(y+z)$. If $(y+z)/(x+y+z)$ is smaller than $0.01+0.1 \times z/(y+z)$, the mixed powder will possibly fail to acquire a fully large discharge capacity. Conversely, if $(y+z)/(x+y+z)$ is larger than $0.15+z/(y+z)$, the mixed powder will possibly fail to realize the cycle property sufficiently because the expansion and contraction of the negative electrode by charging and discharging increases despite the large discharge capacity of the mixed powder.

Secondly, when the powder of the carbonaceous material contains boron, the mixed powder mentioned above is allowed to have a high capacity, a high initial efficiency, and a high cycle property and attain successful repression of the expansion-contraction during each charge-discharge cycle by satisfying the formula:

$$0.01+0.1 \times z1/(y+z1) \leq (y+z1)/(x+y+z) \leq 0.15+z1/(y+z1) \quad (2)$$

wherein x represents the carbon content (wt. %), y the silicon content (wt. %), z1 boron content (wt. %) in the powder of a boron-containing silicon material, z2 the boron content (wt. %) in the powder of a boron-containing carbon material, $z=z1+z2$, and $x+y+z$ is substantially 100%. More preferably, the mixed powder satisfies $0.005+0.1 \times z1/(y+z1) \leq (y+z)/(x+y+z) \leq 0.1+z/(y+z1)$. If $(y+z1)/(x+y+z)$ is smaller than $0.01+0.1 \times z1/(y+z1)$, the mixed powder will possibly fail to acquire a fully large discharge capacity. Conversely, if $(y+z1)/(x+y+z)$ is larger than $0.15+z1/(y+z1)$, the mixed powder will possibly fail to realize the cycle property sufficiently because the expansion and contraction of the negative electrode by charging and discharging increases despite the large discharge capacity of the mixed powder.

When the mixed powder between the powder of a carbon material containing substantially no boron and the powder of a boron-containing silicon material satisfies the condition (1) mentioned above or when the mixed powder between the powder of a boron-containing carbon material and the powder of a boron-containing silicon material satisfies the condition (2) mentioned above, the preferred boron content in the powder of a boron-containing silicon material is as described above. Further, this mixed powder is preferred to produce, in the wide angle X-ray diffraction pattern analysis, such diffraction peaks that the ratio $I(SiB_4:021)/I(Si:111)$ of the peak intensities respectively of the diffraction line from the (021) plane of $SiB_4$ to the diffraction line from the (111) plane of Si is not more than 1 as described above.

When the mixed powder between the powder of a carbon material containing substantially no boron and the powder of a boron-containing silicon material satisfies the condition (1) mentioned above, the powder of the carbon material is preferred to produce, in the wide angle X-ray diffraction pattern analysis, such diffraction peaks that the peak intensities $I(C:101)$ and $I(C:100)$ respectively of the diffraction line from the (101) plane of carbon and the diffraction line from the (100) plane of carbon satisfy the following condition:

$$I(C:101)/I(C:100) \leq 1.$$

At this time, since the powder of the carbon material itself has a high degree of crystallinity (graphitization), and therefore the powder of the carbon material itself has a large discharge capacity, it is made possible to decrease the amount of the powder of a boron-containing silicon material to be mixed and consequently repress the ratio of expansion of the whole negative electrode due to charging.

If the ratio $I(C:101)/I(C:100)$ of peak intensities mentioned above is smaller than 1, the shortage brings the disadvantage that the powder of carbon material itself has a small discharge capacity, the powder of boron-containing silicon material is required to be mixed in a large amount for realizing a discharge capacity exceeding the theoretical capacity of graphite, the mixed powder as the negative electrode material suffers an increase in the ratio of expansion due to charging, and the mixed powder possibly manifests satisfactorily the cycle property only with difficulty.

When the mixed powder between the powder of a boron-containing carbon material and the powder of a boron-containing silicon material satisfies the condition (2) mentioned above, since the powder of a boron-containing carbon material generally has a high crystallinity and a large discharge capacity, the fact itself that the powder of the carbon material contains boron proves advantageous. Particularly, the content by weight of the boron contained in the powdery carbon material is preferred to be not less than 0.5% and not more than 10%. If the boron content exceeds 10%, the excess as clearly demonstrated by the wide angle X-ray diffraction pattern analysis brings the disadvantage that it makes virtually no contribution to the improvement of the crystallinity of the powder of the carbon material, only gives rise to an electrochemically inactive $B_4C$, and results in decreasing the capacity per unit weight proportionately to the amount of $B_4C$ to be formed without contributing to the improvement of the capacity in any respect. Further, the powder of a boron-containing carbon material is preferred to produce, in the wide angle X-ray diffraction pattern analysis, such diffraction peaks that the peak intensities $I(C:101)$ and $I(C:100)$ respectively of the diffraction line from the (101) plane of carbon and the diffraction line from the (100) plane of carbon satisfy the following condition:

$$I(C:101)/I(C:100) \geq 2.$$

In this case, the manifestation of a capacity approximating closely to the theoretical capacity of graphite is made easy because the crystallinity of the powder of the carbon material is improved further.

In the embodiments in which the negative electrode-active material for the lithium secondary battery of this invention is the mixed powder between the powder of a carbon material containing or not containing boron and the powder of a boron-containing silicon material, the greater parts of silicon and carbon do not form a compound or a solid solution chemically or they are not mixed on the level of atoms. The mixed powder is not necessarily a simple mixture of these two powders. It may be obtained by mixing the two powders while pulverizing them by the use of a special pulverizing machine, for example, in such a manner as to avoid seriously impairing the function and effect of this invention. Further, the two powders being mixed may allow part thereof to undergo a chemical alloying reaction or may produce a partially adhering form.

The method for mixing the powder of carbon material and the powder of boron-containing silicon material is only required to produce a thoroughly homogenous mixture of these two powders. These two powders, for example, may be mixed, by suitably using a V-blender, a kneader, or a ball mill, or we mixed. The mixture does not need to be particularly restricted to these methods. The powders in the process of the mixture may undergo a partial reaction or fusion so long as no adverse effect is exerted on the outstanding property of the powder of the boron-containing silicon material. For the adjustment of the particle size and the specific surface area etc. of the powder of boron-containing carbon material after the heat-treatment, any of the various methods generally adopted in the industry may be used. For the pulverization, a ball mill, a pin mill, a disc mill, an impeller mill, a jet mill, a roller mill, a stamp mill, and a cutting mill are advantageously used. For the classification, an air classifier and a sieve are favorably used. These are no exclusive examples.

Since the weight of the negative electrode-active material to be used in one small standard lithium ion secondary battery is as low as about 10 g and the thickness of coating is as small as not more than about 100 μm, however, the process of mixing is desired to attain such high homogeneity that the mixture proceeds on the level of individual particles of the powder. This high degree of homogeneity is attained, for example, by placing one part by weight of the negative electrode-active material in two parts by weight of water incorporating a small amount of a surfactant, isopropyl alcohol, methanol, or ethanol, subjecting the resultant mixture to the so-called wet mixing treatment, then drying and disintegrated the resultant mixture. The mixture for the high degree of homogeneity does not need to be particularly limited to this method.

The method for the manufacture of the negative electrode-active material for the lithium secondary battery of this invention has been described as an illustration. The negative electrode-active material for the lithium secondary battery of this invention does not need to be restricted to the method of manufacture described above. One example of the other methods for the manufacture of the negative electrode-active material for the lithium secondary battery according to this invention comprises subjecting a mixed gas composed of silane gas and diboran gas at a prescribed ratio to a plasma treatment using Ar gas as a carrier gas thereby obtaining a powder of boron-containing silicon material, heat-treating the powder at an approximate temperature of 1380° C. for about one hour thereby obtaining a powder of a boron-containing silicon material usable for the negative electrode-active material for use in the lithium secondary battery of this invention, and mixing this powder with a powder of carbon material or a powder of a boron-containing carbon material to a high degree of homogeneity thereby obtaining the negative electrode-active material for the lithium secondary battery of this invention. Another example of the other methods comprises mixing a silicon powder and a metallic boron at a prescribed ratio, subjecting them thoroughly to a mechanical alloying treatment for about 20 hours by the use of a ball mill, heat-treating the resultant material at about 1380° C. for about one hour, suitably pulverizing and classifying the heat-treated material thereby obtaining the powder of a boron-containing silicon material usable for the negative electrode-active material to be used for the lithium secondary battery of this invention, and mixing this powder with the carbon material powder or the boron-containing carbon material powder to a high degree of homogeneity thereby obtaining the negative electrode-active material for use in the lithium secondary battery of this invention.

The negative electrode-active material for the lithium secondary battery of this invention is composed substantially of boron and silicon or carbon, boron, and silicon. It may contain other elements originating in the raw materials or in the process of manufacture as industrial-level impurities or other elements inevitably introduced on account of a commercial device or an operating condition to such an extent that the function and effect of this invention are not seriously impaired. It may incorporate other elements or compounds for a certain object.

The method for forming a negative electrode with the negative electrode-active material for the lithium secondary battery of this invention does not need to be discriminated in any sense so long as the method thoroughly derives the performance of the negative electrode-active material for the lithium secondary battery of this invention, has a high ability to impart shape, and enjoys a chemical and electrochemical stability. For example, one method comprises adding an electrical conductor such as carbon black and a powder or dispersion solution of a fluorine type resin such as polytetrafluoroethylene to the powder of silicon material and then mixing and kneading them. Another method comprises adding an electrical conductor such as carbon black and a resin power such as polyethylene or polyvinyl alcohol to the powder of silicon material, placing the resultant dry mixture in a die, and molding the mixture with a hot press. Still another method comprises mixing the powder of silicon material with an electrical conductor such as carbon black and the powder of a fluorine type resin such as polyvinylidene fluoride (pVdF) or such a water-soluble binding agent as carboxymethyl cellulose as a binder in a solvent such as N-methyl pyrrolydone (NMP), dimethyl formamide, water, or alcohol, thereby forming a slurry, applying the resultant slurry on a collector, and drying the applied layer of the slurry.

In the embodiment in which the negative electrode-active material for the lithium secondary battery of this invention is a mixed powder between the powder of a carbon material and the powder of a boron-containing silicon material, this mixed powder does not particularly require further addition of an electrical conductor such as carbon black in the formation of a negative electrode because the coexisting powder of carbon material or powder of a boron-containing carbon material sufficiently has the function of an electrical conductor.

The negative electrode-active material of this invention can be used as suitably combined with a positive electrode-active material and a non-aqueous electrolyte (such as, for example, an organic solvent type electrolyte). The non-aqueous electrolyte (such as, for example, an organic solvent type electrolyte) and the positive electrode-active material do not need to be particularly discriminated so long as they belong to the respective classes of objects generally used in the lithium secondary battery.

As the positive electrode active material, lithium-containing transition metal oxides, $LiM(1)_xO_2$ (wherein x represents a numerical value in the range of $0 \leq x \leq 1$ and M(1) represents a transition metal which is at least one member selected from the group consisting of Co, Ni, Mn, Cr, Ti, V, Fe, Zn, Al, In, and Sn) or $LiM(1)_yM(2)_{2-y}O_4$ (wherein y represents a numerical value in the range of $0 \leq y \leq 1$ and M(1) and M(2) independently represent transition metals which, are at least one member selected from the group consisting of Co, Ni, Mn, Cr, Ti, V, Fe, Zn, B, Al, In, and Sn), chalcogenides of transition metals (such as, for example, $TiS_2$ and $NbSe_3$), vanadium oxides ($V_2O_5$, $V_6O_{13}$, $V_2O_4$, $V_3O_8$, etc.) and Li compounds thereof, Chevrel phase compounds represented by the general formula, $M_xMO_6Ch_{8-y}$ (wherein x and y represent numerical values respectively in the ranges of $0 \leq x\ 4$ and $0 \leq y \leq 1$, M represents one member selected from the group consisting of transition metals and other metals, and Ch represents a chalcogen element), active carbon, and active carbon fibers are usable.

The organic solvent in the non-aqueous electrolyte (such as, for example, an organic solvent type electrolyte) does not need to be particularly discriminated. As concrete examples of the organic solvent, propylene carbonate, ethylene carbonate, butylene carbonate, chloroethylene carbonate, dimethyl carbonate, diethyl carbonate, 1,1-dimethoxy ethane, 1,2-dimethoxy ethane, 1,2-diethoxy ethane, γ-butyrolactone, tetrahydrofuran, 2-methyl tetrahydrofuran, 1,3-dioxolane, 4-methyl-1,3-dioxolane, anisol, diethyl ether, sulfolane, methyl sulfolane, acetonitrile, chloronitrile, propionitrile, trimethyl borate, tetramethyl silicate, nitromethane, dimethyl formamide, N-methyl pyrrolidone, ethyl acetate, trimethyl orthoformate, nitrobenzene, benzoyl chloride, benzoyl bromide, tetrahydrothiophene, dimethyl sulfoxide, 3-methyl-2-oxazolidone, ethylene glycol, sulfite, and dimethyl sulfite may be cited. These organic solvents may be used either singly or in the form of a mixture of two or more members.

The electrolyte may be any of the electrolytes heretofore known to the art. As concrete examples of the electrolyte, $LiClO_4$, $LiBF_4$, $LiPF_6$, $LiAsF_6$, $LiB(C_6H_5)$, $LiCl$, $LiBr$, $LiCF_3SO_3$, $LiCH_3SO_3$, $Li(CF_3SO_2)_2N$, $Li(CF_3SO_2)_3C$, $Li(CF_3CH_2OSO_2)_2N$, $Li(CF_3CF_2CH_2OSO_2)_2N$, $Li(HCF_2CF_2CH_2OSO_2)_2N$, $Li((CF_3)_2CHOSO_2)_2N$, and $LiB[C_6H_3(CF_3)_2]_4$ may be cited. These electrolytes may be used either singly or in the form of a mixture of two or more members.

Now, methods for expressing and methods for determining various properties which are used herein for defining the negative electrode-active material for the lithium secondary battery of this invention will be shown below.

(1) Carbon Content, Silicon Content, and Boron Content

These contents was quantified by the ICP method (method of inductively coupled plasma emission spectroscopy).

(2) 50% Cumulative Diameter ($d_{50}$)

The particle size distribution of a given sample was determined by performing a computation on the diffraction pattern produced by irradiating dispersed particles of the sample with a parallel ray and the particle diameter whose cumulative weight reached 50% was obtained as 50% cumulative diameter ($d_{50}$). Generally, this diameter was determined by placing about 0.2 g of a given sample in 20 cc of water as a dispersant, adding two or three drops of a commercially available surfactant to the resultant dispersion, and subjecting the produced dispersion to the test with a particle size distribution measuring device made by Seishin Kigyo K. K. and sold under the product code of "LMS-24."

(3) Specific Surface Area

The specific surface area of a sample was determined by obtaining a curve of quantity of adsorption relative to nitrogen partial pressures to be found when the sample was caused to adsorb nitrogen and then analyzing the curve by the BET method. Generally, the sample, 1–2 g in weight, was subjected to the test with an instrument made by Nippon Bell K. K. and sold under the trademark designation of "BELSORP-36."

(4) $I(SiB_4:021)/I(Si:111)$

A given sample powder was irradiated with a simple color X-ray collimated in advance into a parallel beam and the peaks corresponding respectively to the (111) plane of Si and the (021) plane of $SiB_4$ were measured. From the respective peak intensities relieved of background, the ratio $I(SiB_4:021)/I(Si:111)$ of peak intensities was calculated.

(5) $I(C:101)/I(C:100)$

A given sample powder was irradiated with a simple color X-ray collimated in advance into a parallel beam and the peaks corresponding respectively to the diffraction line from the (100) plane of carbon and the diffraction line from the (101) plane of carbon were measured. From the respective peak intensities relieved of background, the ratio $I(C:101)/I(C:100)$ of peak intensities was calculated.

EXAMPLES

This invention will be described more specifically below with reference to concrete examples of the invention. The examples shown herein below are intended solely for the purpose of permitting clear comprehension of the contents of this invention. This invention is not restricted in any way by the examples disclosed.

Example 1

A powder of silicon (purity 99.9%, $d_{50}$=10 μm) and a boron powder (purity 99.9%) added thereto in an amount of 1% by weight based on the total weight were thoroughly mixed by the use of a kneader. The mixture was heated to 1400° C. in a stream of argon, kept at this temperature for five hours, and cooled to room temperature over a period of about three hours to obtain a powder of silicon material for use in a lithium secondary battery. The powder of silicon material thus prepared was found to have a boron content of 0.5% by weight. By disintegrating the powder of boron-containing silicon material with an impeller mill and subjecting the disintegrated powder to adjustment of particle size by the use of a pneumatic classifier, a powder having a 50% cumulative diameter ($d_{50}$) of 15 μm was obtained. This powder was found to have a specific surface area of 5.1 $m^2/g$. When this material was assayed by the X-ray diffraction, no peak of $SiB_4$ was observed and the ratio of peak intensities, $I(SiB_4:021)/I(Si:111)$, was found to be 0. The result indicates that the whole boron in the material formed a solid solution with silicon.

To 70 wt. % of the powder of boron-containing silicon material, 20 wt. % of carbon black as an electrical conductor and 10 wt. % of a polytetrafluoroethylene powder as a binder were added. They were kneaded together to manufacture an electrode sheet, about 0.1 mm in thickness. A square of 1 cm (about 21 mg in weight) was cut from the sheet (about 15 mg as reduced to the silicon material) and contact bonded to a Cu mesh as a collector to form a negative electrode.

To rate the formed electrode as a monopole for the electrode property, a three electrode cell using metallic lithium as a counter electrode and a reference electrode was used. The electrolyte used in the test was prepared by dissolving $LiPF_6$ in a ratio of 1 mol/liter in a mixed solvent composed of ethylene carbonate and diethyl carbonate (mixed at a volumetric ratio of 1:1). The charge-discharge test was performed by carrying out both charging and discharging under a limited potential range with a fixed current (0.5 mA/cm$^2$). The range of the potential was from 0 V to 2.0 V (metallic lithium as the standard). By the rating conducted under these conditions, the powder of boron-containing silicon material was found to have an initial charge capacity of 2500 mAh/g and an initial discharge capacity of 2000 m/g and consequently a small initial capacity loss of 500 mAh/g. Virtually no capacity loss was observed in the second and following cycles. The powder was found to have a very high electrode property as evinced by the fact that in the second and following charge-discharge cycles, the powder showed an excellent cycle property without producing any noticeable change in the discharge capacity.

Example 2

A material was prepared by following the procedure of Example 1 while adding boron in an amount of 10% by weight. The produced material was found to have a boron content of 9.0% by weight. By disintegrating the produced powder of boron-containing silicon material with a jet mill and subjecting the disintegrated powder to adjustment of particle size by the use of a pneumatic classifier, a powder having a 50% cumulative diameter ($d_{50}$) of 20 µm was obtained. This powder was found to have a specific surface area of 3.5 $m^2/g$. When this material was assayed by the X-ray diffraction, a very small peak corresponding to $SiB_4$ was obtained in conjunction with a peak corresponding to silicon and the ratio of peak intensities, $I(SiB_4:021)/I(Si:111)$, was found by calculation to be 0.05. The results indicate that the boron in the material nearly wholly formed a solid solution with silicon.

The powder of boron-containing silicon material prepared as described above was rated for electrode property under the same conditions as in Example 1. As a result, this powder of boron-containing silicon material was found to have an initial charge capacity of 2400 mAh/g and an initial discharge capacity of 2000 mAh/g and consequently a small initial capacity loss of 400 mAh/g. Virtually no capacity loss was observed in the second and following cycles.

The powder was found to have a very high electrode property as evinced by the fact that in the second and following charge-discharge cycles, the powder showed an excellent cycle property without producing any noticeable change in the discharge capacity.

Example 3

A material was prepared by following the procedure of Example 1 while adding boron in an amount of 50% by weight. The produced material was found to have a boron content of 48.9% by weight. By disintegrating the produced powder of boron-containing silicon material with a pin mill and subjecting the disintegrated powder to adjustment of particle size by the use of a pneumatic classifier, a powder having a 50% cumulative diameter ($d_{50}$) of 5 µm was obtained. This powder was found to have a specific surface area of 25.3 $m^2/g$. When this material was assayed by the X-ray diffraction, a peak corresponding to $SiB_4$ was obtained in conjunction with a peak corresponding to silicon and the ratio of peak intensities, $I(SiB_4:021)/I(Si:111)$, was found by calculation to be 0.88. The results indicate that part of the boron former a solid solution with silicon and these elements partly formed $SiB_4$.

The powder of boron-containing silicon material prepared as described above was rated for electrode property under the same conditions as in Example 1. As a result, this powder of boron-containing silicon material was found to have an initial charge capacity of 800 mAh/g and an initial discharge capacity of 500 mAh/g and consequently a small initial capacity loss of 300 mAh/g. virtually no capacity loss was observed in the second and following cycles. The powder was found to have a very high electrode property as evinced by the fact that in the second and following charge-discharge cycles, the powder showed an excellent cycle property without producing any noticeable change in the discharge capacity.

Control 1

A powder of silicon (purity 99.9%) was used as a negative electrode-active material for a lithium secondary battery. This powder was found to have a 50% cumulative diameter ($d_{50}$) of 10 µm and a specific surface area of 8.7 $m^2/g$. This material was subjected to the electrode rating under the same conditions as in Example 1. As a result, this negative electrode-active material was found to have a large initial discharge capacity of 2000 mAh/g and an initial charge capacity of 3300 mAh/g and consequently a very large initial capacity loss of 1300 mAh/g. When the charge-discharge cycle was repeated, the capacity loss was so large as 800 mAh/g even in the second cycle and thereafter gradually decreased and brought to 0 mAh/g on the 7th cycle. Thus, the total capacity loss was very large. The electrode for the lithium secondary battery using the powder could not withstand practical use as evinced by the fact that, with the increase of the total of cycles, the discharge capacity sharply lowered and fell to 200 mAh/g on the 10th cycle.

Control 2

A material was prepared by following the procedure of Example 1 while adding boron in an amount of 56% by weight. By disintegrating the resultant powder of a boron silicate material with an impeller mill, a powder having a 50% cumulative diameter ($d_{50}$) of 20 µm was obtained. This powder was found to have a specific surface area of 2.1 $m^2/g$. The boron content in the produced material was found to be 54.5% by weight. When this material was subjected to the X-ray diffraction analysis, peaks corresponding to $SiB_4$ and $SiB_6$ were observed in conjunction with a peak corresponding to silicon and the ratio of peak intensities, $I(SiB_4:021)/I(Si:111)$, was found to be 0.96. A solid solution phase of boron-silicon with a high concentration of boron was formed, and the boron exceeding the soluble limit formed the coexisting $SiB_4$, and slightly formed silicon boride ($SiB_6$) having a still higher boron concentration.

The powder of a boron-containing silicon material prepared as described above was rated for the electrode property under the same conditions as in Example 1. As a result, the initial discharge capacity had a very small value of 170 mAg/g. The initial charge capacity was also repressed to a low level of 370 mAh/g since the silicon boride ($SiB_6$) of high concentration for boron was present in addition to $SiB_4$. The electrode for lithium secondary battery using the powder did not withstand practical use as evinced by the fact that as the charging-discharging was repeated, the discharge capacity continued to decrease even in the second and following cycles and reached 140 mAh/g in the 10th cycle.

Examples 4–10 and Controls 3–6
<Preparation of Raw Material Powders>

A pitch coke powder obtained from coal tar pitch was pulverized with a ball mill and then sieved through a 325 mesh screen. The powder collecting under the screen was extracted. This powder and a boron powder (purity 99.9%, 325 mesh under) added thereto in a varying amount were thoroughly mixed. The produced mixed powders (four boron concentrations of 0, 2, 4, 6%) were each placed in a cylindrical graphite crucible and sealed hermetically with a threaded lid. This sealed crucible was heated in an electric furnace to 2900° C. at a temperature increasing rate of about 12° C./min, with Ar gas passed at a rate of 10 liters/min, and then kept at this temperature for one hour, and thereafter cooled to room temperature. The carbon material powder withdrawn from the cylindrical graphite crucible was pulverized with an impeller mill and classified to obtain a powder of carbon material. From the X-ray diffraction pattern of this powder, the ratio of peak intensities, $I(C:101)/I(C:100)$, and the boron content were determined. The samples containing added boron at concentrations of 0, 2, 4, and 6 wt. %, after a heat treatment, had boron concentrations respectively of 0, 1.2, 2.5, and 4.3 wt. %.

A silicon powder (purity 99.9%, 325 mesh under) and a boron powder (purity 99.9%, 325 mesh under) added thereto at a varying ratio of 10, 22, 38, 54, 60, and 68 wt. % based on total amount were thoroughly mixed. The resultant mixture was placed in a cylindrical graphite crucible and then hermetically sealed with a threaded lid. This sealed crucible was heated to 1385° C. in an electric furnace, with argon gas passed at a rate of 10 liters/min., and then kept at this temperature for 10 hours, and subsequently cooled to the neighborhood of room temperature. The average cooling rate from 1385° C. to 600° C. was about 33° C./min. The produced powder was disintegrated with an impeller mill to obtain a powder of 325 mesh under. From the X-ray diffraction of the sample, the ratio of peak intensities, $I(SiB_4:021)/I(Si111)$, was determined. When the powder samples were tested for boron content, the samples having added boron contents of 10, 22, 38, 54, 60, and 68 wt. %, after heat treatment and shredding, were found to have boron contents respectively of 10, 21, 37, 52, 59, and 66 wt. %. Thus, the added boron remained nearly intact even after the heat treatment.

A silicon powder (purity 99.9%, 325 mesh under) and a boron powder (purity 99.9%, 325 mesh under) added thereto in an amount of 45 wt. % based on the total amount were thoroughly mixed. The resultant mixture was subjected to a mechanical alloying reaction for 23 hours by the use of a ball mill, then heated in a stream of argon flowing at a rate of 10 liters/min to 1385° C. in the same manner as described above, kept at this temperature for one hour, and cooled to room temperature over a period of about three hours. The produced powder was disintegrated with an impeller mill to obtain a powder of 325mesh under. From the X-ray diffraction of the sample, the ratio of peak intensities, $I(SiB_4:021)$ $I(Si:111)$, was measured. When this powder was tested for boron content, the boron content was found to be 44 wt. % The result indicates that the added boron remained intact in spite of the treatment.

<Preparation of Mixed Powder>

In a large beaker, a total of about 500 g of two powder, i.e the powder of carbon containing or not containing boron and the powder of boron-containing silicon both obtained as described above, were placed together with about 1 kg of ethanol. They were stirred together at room temperature for about one hour and the resultant mixture was suction filtered with a filter paper. The powder which remained on the filter paper was vacuum dried at 100° C. for 24 hours to obtain a mixed powder. Several such mixed powders were prepared by varying the kind of powder before the mixture and the mixing ratio.

<Manufacture of Electrode and Test of Electrode for Rating>

The carbon material powder and the silicon material powder indicated in Table 1 were mixed in prescribed amounts and the resultant mixed powder was determined for carbon content, x (wt. %), boron content, z (wt. %), boron content, z1 (wt. %), present in the silicon powder within the whole boron content z, and boron content, z2 (wt. %), present in the carbon powder. The results are shown in Table 1. The ratios of the contents of these elements, $C1=z1/(y+z1)$, $C2=(y+z1)/(x+y+z)$, and $C3=z2/(x+z2)$, and the ratios of peak intensities, $I1=I(SiB_4:021)/I(Si:111)$ and $I2=I(C:101)/I(C:100)$, found by the x-ray diffraction are also shown in Table 1. The electrode was manufactured by using the mixed powder manufactured as described below for the negative electrode-active material for use in the lithium secondary battery and the electrode was tested for discharge capacity, initial efficiency, and cycle property. The results are also shown in Table 1.

A coating paste was prepared from the powder of a negative electrode-active material by using PVDF as a binder and NMP as a solvent. This coating liquid was applied on a Cu sheet and the coated Cu sheet was pressed to form an electrode sheet, about 0.1 mm in thickness. A square of 1 cm was cut from the electrode sheet to form a negative electrode. The coating density was set at about 1.3 g/cm$^3$.

To rate the formed negative electrode as a monopole for the electrode property, a three electrode cell using metallic lithium as a counter electrode and a reference electrode was used. The electrolyte used in the test was prepared by dissolving LiCl$_4$ in a ratio of 1 mol/liter in a mixed solvent composed of ethylene carbonate and diethyl carbonate (mixed at a volume ratio of 1:1). The charge-discharge test was performed by carrying out both charging and discharging under a limited potential range with a fixed current (0.5 mA/cm$^2$). The range of the potential was from 0 V to 2.0 V (metallic lithium as the standard). The cycle of charging-discharging was performed up to 100 repetitions.

By this test for evaluation of electrode, the maximum discharge capacity per g of the mixed powder rated as a discharge capacity, the so-called initial efficiency, i.e. the charge-discharge efficiency in the first charge-discharge cycle, and the ratio of the discharge capacity (cyclic property) per g of the mixed powder during the 100th cycle to the maximum discharge capacity per g of the mixed powder were determined.

The samples shown in Examples 4–10 were such that the boron contents in the boron containing silicon material powders used therein were in the range of 0.1–50 wt. %, and the values of $I(SiB_4:021)/I(Si:111)$ were not more than one, and their mixing ratios of the silicon material powder in the mixed powder invariably satisfied the condition, $0.01+0.1\times C1 \leq C2 \leq 0.15+C1$.

The electrodes using these samples were found to have discharge capacities invariably surpassing the theoretical capacity, 372 mAh/g, of graphite and to show high initial efficiencies of not less than 90%. Although they showed a trend of slightly lowering the cycle property in accordance with the discharge capacity increased, they showed an excellent cycle property as evinced by the fact that they retained not less than 80% of the maximum discharge capacity even after a total of 100 charge-discharge cycles.

In contrast, the samples shown in Controls 3–6 were such that the boron contents in the boron containing silicon material powders used therein exceeded 50 wt. %, and the mixing ratios of the silicon material powder in the mixed powder invariably failed to satisfy the condition, $0.01+0.1\times C1 \leq C2 \leq 0.15+C1$.

In the samples of Controls 3 and 4, the mixing ratios, C2, of the boron containing silicon material powder in the mixed powder were $C2<0.1+0.1\times C1$ and the discharge capacities were so low as to fall below the theoretical capacity of graphite. The initial efficiencies had high values in the proximity of 90% and the cycle properties were such that the maximum discharge capacities were not lower than 90even after a total of 100 charge-discharge cycles. The discharge capacities falling below the theoretical capacity of graphite were not widely different from those of the conventional graphite type negative electrode materials. Thus, the samples hardly deserved the name of attractive material. Further, in the samples of Controls 5 and 6, the mixing ratios, C2, of the boron containing silicon material powder in the mixed powder were $0.15+C1<C2$ and the discharge capacities surpassed the theoretical capacity, 372 mAh/g, of graphite and the initial efficiencies had high values, in the proximity of 90%. Their cycle properties, however, declined conspicuously. Particularly, the maximum discharge capacities were approximately 70% after a total of 100 charge-discharge cycles. These materials, therefore, seem to find utility in practical batteries with great difficulty.

TABLE 1

|  | Boron content in carbon material powder (wt. %) | Boron content in silicon material powder (wt. %) | x (wt %) | y (wt %) | z (wt %) | z1 (wt %) | z2 (wt %) |
|---|---|---|---|---|---|---|---|
| Example 4 | 0 | 10 | 93.4 | 5.3 | 0.6 | 0.6 | 0 |
| Example 5 | 0 | 10 | 89.6 | 9.1 | 1.0 | 1.0 | 0 |
| Example 6 | 1.2 | 10 | 79.5 | 17.2 | 3.0 | 2.0 | 1.0 |
| Example 7 | 0 | 10 | 77.8 | 19.9 | 2.1 | 2.1 | 0 |
| Example 8 | 0 | 21 | 89.2 | 8.1 | 2.2 | 2.2 | 0 |
| Example 9 | 0 | 37 | 89.5 | 6.2 | 3.7 | 3.7 | 0 |
| Example 10 | 2.5 | 44 | 86.9 | 5.8 | 6.8 | 4.6 | 2.2 |
| Control 3 | 0 | 59 | 94.5 | 2.1 | 3.0 | 3.0 | 0 |
| Control 4 | 4.3 | 66 | 90.4 | 1.8 | 7.6 | 3.5 | 4.1 |
| Control 5 | 0 | 52 | 22.5 | 37.3 | 39.8 | 39.8 | 0 |
| Control 6 | 2.5 | 52 | 11.4 | 42.6 | 45.8 | 45.5 | 0.3 |

|  | C1 | C2 | C3 | I1 | I2 | Discharge capacity (mAh/g) | Initial Effeciency (%) | Cyclic property (%) |
|---|---|---|---|---|---|---|---|---|
| Example 4 | 0.10 | 0.06 | 0 | 0.06 | 2.2 | 460 | 90.3 | 93 |
| Example 5 | 0.10 | 0.10 | 0 | 0.06 | 2.2 | 550 | 90.1 | 90 |
| Example 6 | 0.10 | 0.19 | 0.012 | 0.06 | 2.6 | 750 | 91.5 | 90 |
| Example 7 | 0.10 | 0.22 | 0 | 0.06 | 2.2 | 810 | 90.2 | 82 |
| Example 8 | 0.21 | 0.10 | 0 | 0.24 | 2.2 | 490 | 91.7 | 93 |
| Example 9 | 0.37 | 0.10 | 0 | 0.71 | 2.2 | 410 | 91.0 | 94 |
| Example 10 | 0.44 | 0.10 | 0.025 | 0.99 | 3.1 | 400 | 92.6 | 93 |
| Control 3 | 0.59 | 0.05 | 0 | 1.74 | 2.2 | 320 | 90.3 | 94 |
| Control 4 | 0.66 | 0.05 | 0.043 | 2.19 | 3.6 | 290 | 88.8 | 95 |
| Control 5 | 0.52 | 0.77 | 0 | 1.34 | 2.2 | 390 | 92.1 | 69 |
| Control 6 | 0.52 | 0.88 | 0.026 | 1.34 | 3.1 | 400 | 91.0 | 71 |

Example 11

The sample of Example 9 was manufactured into a cylindrical lithium ion secondary battery of type 18650. The battery was given a total of 500 cycles of trial charging-discharging. It showed a high cycle property as evinced by the fact that the discharge capacity in the 500th cycle was 71% of the maximum discharge capacity. When the cell was disassembled after the test, the spirally wound electrode retained the shape thereof intact and showed no discernible sign of deterioration anywhere.

The entire disclosures of Japanese Patent Application No. 10-158,673 filed on Sep. 11, 1998, and Nos. 11-254,358 and 11-254,359 both filed on Sep. 8, 1999, including their specifications, claims, drawings, and summaries are incorporated herein by reference in their entirety.

What is claimed is:

1. A negative electrode active material for use in a lithium secondary battery which comprises boron-containing silicon material powder, wherein $SiB_4$ grains are precipitated in individual particles of the boron-containing silicon material powder, and wherein a boron content in the boron-containing silicon material powder is in the range of 0.1–50 wt. %.

2. A negative electrode active material according to claim 1, wherein said negative electrode active material has a 50% cumulative diameter ($d_{50}$) in the range of 1–100 μm.

3. A negative electrode active material according to claim 1, wherein said negative electrode active material has a ratio $I(SiB_4:021)/I(Si:111)$ of the peak intensity $I(SiB_4:021)$ of the diffraction line from the (021) plane of $SiB_4$ to the peak intensity $I(Si:111)$ of the diffraction line from the (111) plane of Si, which are found in an analysis of the active material by the X-ray wide angle diffraction method, being not more than 1.

4. A negative electrode active material for use in a lithium secondary battery which comprises a powder of a carbon material and boron-containing silicon material powder, which are mixed together, wherein $SiB_4$ grains are precipitated in individual particles of the boron-containing silicon material powder, and wherein a boron content in the boron-containing silicon material powder is in the range of 0.1–50 wt. %, and wherein the carbon material is one of carbon material containing boron and carbon material containing no boron.

5. A negative electrode active material for a lithium secondary battery according to claim 4, wherein said negative electrode active material has a 50% cumulative diameter ($d_{50}$) in the range of 1–100 μm.

6. A negative electrode active material for a lithium secondary battery according to claim 4, wherein said negative electrode active material has a ratio $I(SiB_4:021)/I(Si:111)$ of the peak intensity $I(SiB_4:021)$ of the diffraction line from the (021) plane of $SiB_4$ to the peak intensity $I(Si:111)$ of the diffraction line from the (111) plane of Si, which are found in an analysis of the active material by the X-ray wide angle diffraction method, being not more than 1.

7. A negative electrode active material for a lithium secondary battery according to claim 4, wherein said powder of carbon material is a powder of a carbon material containing no boron, and in the diffraction peaks of said mixed powder measured by the wide angle X-ray diffraction method, the peak intensity, $I(C:101)$, of the diffraction line from the (101) plane of carbon and the peak intensity, $I(C:100)$, of the diffraction line from the (100) plane of carbon are such that the ratio of said two peak intensities, $I(C:101)/I(C:100)$, is not less than 1.

8. A negative electrode active material for a lithium secondary battery according to claim 4, wherein said powder of carbon material is a powder of a carbon material containing boron, and in the diffraction peaks of said mixed powder measured by the wide angle X-ray diffraction method, the peak intensity, I(C:101), of the diffraction line from the (101) plane of carbon and the peak intensity, I(C:100), of the diffraction line from the (100) plane of carbon are such that the ratio of said two peak intensities, I(C:101)/I(C:100), is not less than 2.

9. A lithium secondary battery which comprises a positive electrode active material, a negative electrode active material, and a non-aqueous electrolyte, wherein said negative electrode active material comprises boron-containing silicon material powder, wherein $SiB_4$ grains are precipitated in individual particles of the boron-containing silicon material powder, and wherein a boron content in the boron-containing silicon material powder is in the range of 0.1–50 wt. %.

10. A lithium secondary battery according to claim 9, wherein said negative electrode active material has a 50% cumulative diameter ($d_{50}$) in the range of 1–100 μm.

11. A lithium secondary battery according to claim 9, wherein said negative electrode active material is found by the wide angle X-ray diffraction method to have a peak intensity, I(Si:111) of the diffraction line from the (111) plane of Si and a peak intensity, I($SiB_4$:021) of the diffraction line from the (021) plane of $SiB_4$ and the ratio of said two peak intensities, I($SiB_4$:021) /I(Si:111), is not more than 1.

12. A lithium secondary battery which comprises a positive electrode active material, a negative electrode active material, and a non-aqueous electrolyte, wherein said negative electrode active material comprises a powder of a carbon material and boron-containing silicon material powder, which are mixed together, wherein $SiB_4$ grains are precipitated in individual particles of the boron-containing silicon material powder, and wherein a boron content in the boron-containing silicon material powder is in the range of 0.1–50 wt. %, and wherein the carbon material is one of carbon material containing boron and carbon material containing no boron.

13. A lithium secondary battery according to claim 12, wherein said negative electrode active material has a 50% cumulative diameter ($d_{50}$) in the range of 1–100 μm.

14. A lithium secondary battery according to claim 12, wherein said negative electrode active material is found by the wide angle X-ray diffraction method to have a peak intensity, I(Si:111) of the diffraction line from the (111) plane of Si and a peak intensity, I($SiB_4$:021) of the diffraction line from the (021) plane of $SiB_4$ and the ratio of said two peak intensities, I($SiB_4$:021)/I(Si:111), is not more than 1.

15. A lithium secondary battery according to claim 12, wherein said powder of carbon material is a powder of a carbon material containing no boron and in the diffraction peaks of said mixed powder measured by the wide angle X-ray diffraction method, the peak intensity, I(C:101), of the diffraction line from the (101) plane of carbon and the peak intensity, I(C:100), of the diffraction line from the (100) plane of carbon are such that the ratio of said two peak intensities, I(C:101)/I(C:100), is not less than 1.

16. A lithium secondary battery according to claim 12, wherein said powder of carbon material is a powder of a carbon material containing boron, and in the diffraction peaks of said mixed powder measured by the wide angle X-ray diffraction method, the peak intensity, I(C:101), of the diffraction line from the (101) plane of carbon and the peak intensity, I(C:100), of the diffraction line from the (100) plane of carbon are such that the ratio of said two peak intensities, I(C:101)/I(C:100), is not less than 2.

17. A negative electrode active material according to claim 1, wherein the powder of boron containing silicon material is produced by a process which comprises mixing a powder of a silicon with a powder of a boron compound in an amount of 0.1–50 wt. %, as boron, based on the total weight of silicon and boron used, heating the mixture in an atmosphere of argon to a temperature in the range of 1350° C.–1400° C., retaining the heated mixture at this temperature for a period in the range of 1–10 hours, and subsequently cooling the mixture.

18. A negative electrode active material according to claim 4, wherein the powder of boron containing silicon material is produced by a process which comprises mixing a powder of a silicon with a powder of a boron compound in an amount of 0.1–50 wt. %, as boron, based on the total weight of silicon and boron used, heating the mixture in an atmosphere of argon to a temperature in the range of 1350° C.–1400° C., retaining the heated mixture at this temperature for a period in the range of 1–10 hours, and subsequently cooling the mixture.

19. A lithium secondary battery according to claim 9, wherein the powder of silicon material containing boron is produced by a process which comprises mixing a powder of a silicon with a powder of a boron compound in an amount of 0.1–50 wt. %, as boron, based on the total weight of silicon and boron used, heating the mixture in an atmosphere of argon to a temperature in the range of 1350° C.–1400° C., retaining the heated mixture at this temperature for a period in the range of 1–10 hours, and subsequently cooling the mixture.

20. A lithium secondary battery according to claim 12, wherein the powder of boron containing silicon material is produced by a process which comprises mixing a powder of a silicon with a powder of a boron compound in an amount of 0.1–50 wt. %, as boron, based on the total weight of silicon and boron used, heating the mixture in an atmosphere of argon to a temperature in the range of 1350° C.–1400° C., retaining the heated mixture at this temperature for a period in the range of 1–10 hours, and subsequently cooling the mixture.

* * * * *